(12) United States Patent
Bartman

(10) Patent No.: US 6,489,702 B1
(45) Date of Patent: Dec. 3, 2002

(54) ALTERNATOR

(75) Inventor: Daniel E. Bartman, Hinsdale, NY (US)

(73) Assignee: Prestolite Electric, Ann Arbor, MI (US)

( * ) Notice: Subject to any disclaimer, the term of this patent is extended or adjusted under 35 U.S.C. 154(b) by 20 days.

(21) Appl. No.: 09/635,811

(22) Filed: Aug. 9, 2000

Related U.S. Application Data

(63) Continuation-in-part of application No. 09/498,384, filed on Feb. 3, 2000, now abandoned.
(60) Provisional application No. 60/132,883, filed on May 6, 1999.

(51) Int. Cl.[7] ............................................. H01R 39/00
(52) U.S. Cl. ........................ 310/219; 310/231; 439/17; 439/18; 439/19
(58) Field of Search .......................... 310/90, 219, 231; 439/17–19, 178

(56) References Cited

U.S. PATENT DOCUMENTS

| | | | | |
|---|---|---|---|---|
| 2,409,600 A | * | 10/1946 | Trautschold | ................ 310/219 |
| 3,105,728 A | * | 10/1963 | Seeloff | ......................... 439/29 |
| 3,216,262 A | | 11/1965 | Swarts et al. | |
| 3,564,477 A | | 2/1971 | Pompei | |
| 3,581,267 A | * | 5/1971 | Schreffler | ....................... 439/3 |
| 3,940,200 A | * | 2/1976 | Schreffler | ..................... 439/17 |
| 4,006,954 A | | 2/1977 | Ikawa et al. | |
| 4,462,648 A | | 7/1984 | Fohl | |
| 4,548,454 A | | 10/1985 | Zeller et al. | |
| 4,746,297 A | * | 5/1988 | Soleau | ........................... 439/8 |
| 4,920,890 A | | 5/1990 | Barber | |
| 5,139,425 A | | 8/1992 | Daviet et al. | |
| 5,305,062 A | * | 4/1994 | Sato et al. | ..................... 399/90 |
| 5,356,227 A | | 10/1994 | Sibley et al. | |
| 5,551,143 A | | 9/1996 | Saval et al. | |
| 5,773,394 A | | 6/1998 | Wan et al. | |
| 5,853,294 A | * | 12/1998 | Rehder | ......................... 439/17 |
| 5,863,135 A | * | 1/1999 | Bildtsen et al. | ............. 384/477 |
| 5,923,114 A | | 7/1999 | Senni | |

* cited by examiner

*Primary Examiner*—Joseph Waks
(74) *Attorney, Agent, or Firm*—McAndrews, Held & Malloy, Ltd.

(57) ABSTRACT

An alternator adapted for use with a motor vehicle includes rotor assembly and a stator assembly, which may be like the rotor and state assemblies of brush-type alternators, and also a contact assembly that includes two relatively low-friction, electrically conductive, ball bearing assemblies that are adapted to conduct the DC exciting current for the alternator and that are electrically isolated from each other. Each ball bearing assemblies include inner and outer races that are electrically connected to each other by a plurality of bearing balls and by electrically conductive grease which is packed about the balls. The inner race of each ball bearing is rotatably secured to the rotary shaft of the rotor assembly and is connected to electrical leads which, in turn, are connected with the rotor assembly. The outer race of each ball bearing is fixed relative to the rotary shaft and is connected with a storage battery.

13 Claims, 5 Drawing Sheets

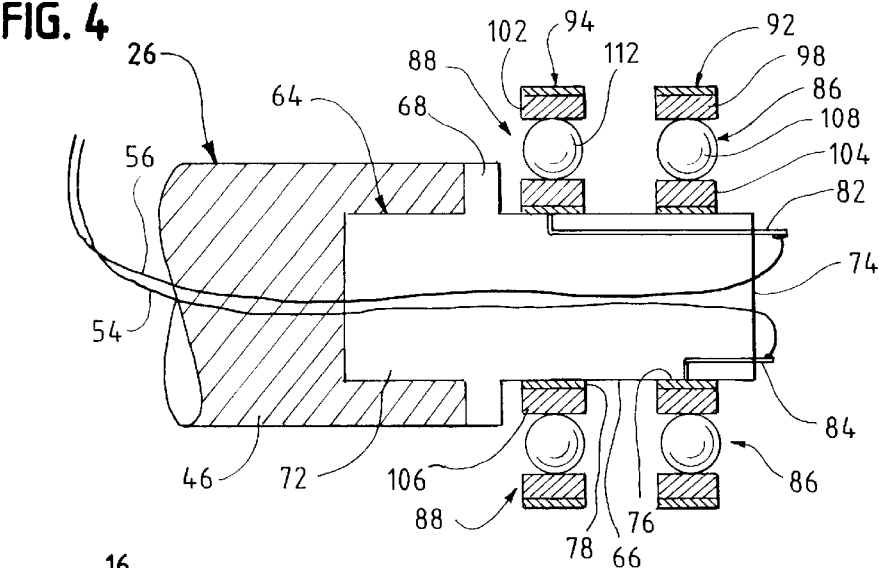
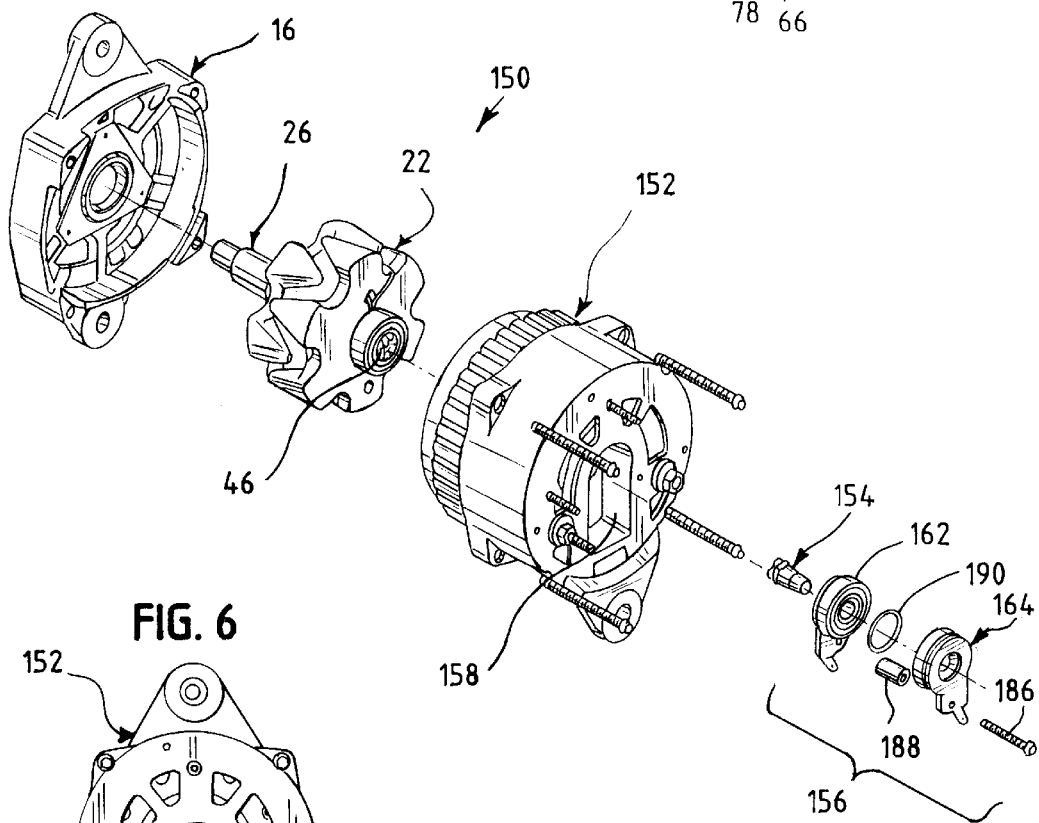
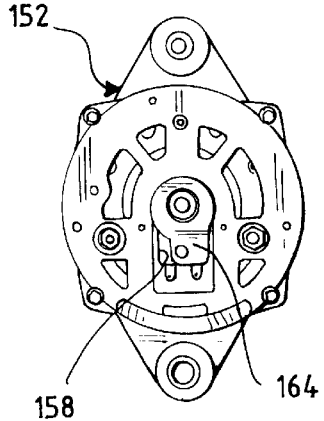

ALTERNATOR

CROSS REFERENCE TO RELATED APPLICATIONS

The present application is based on, and claims priority from, U.S. provisional application Ser. No. 60/132,883, filed May 6, 1999, titled "Anti-Friction Brushless Alternator", which is incorporated herein in its entirety by reference, and is a continuation-in-part of U.S. application Ser. No. 09/498,384, filed Feb. 3, 2000 abandoned.

STATEMENT REGARDING FEDERALLY SPONSORED RESEARCH OR DEVELOPMENT (NOT APPLICABLE)

BACKGROUND OF THE INVENTION

The present invention relates generally to electrical machines commonly known as alternators. More specifically, the present invention relates to an improved alternator in which an exciting or field current is supplied to a rotor assembly so that the rotor assembly and a stator assembly may electromagnetically cooperate to generate an AC current for use by and in the operation of, for example, motor vehicles such as heavy duty and business class trucks.

The basic function of an alternator is to generate the AC current. Two types of alternators, a brush-type alternator and a brushless-type alternator, have been commonly employed by the art.

In brush-type alternators, the exciting (DC) current is conventionally supplied to the rotor assembly, in part, by brushes that are in physical, sliding contact with a portion of the rotor shaft of the alternator. Brushless-type alternators, as the name implies, do not use brushes in supplying the exciting current. Rather the exciting current is supplied to the fixed core or stator so that there is a stationary field.

The employment of brushes is a long recognized disadvantage for brush-type alternators. The brushes tend to wear, due to the "mechanical," brush-to-rotor shaft contact, and have a relatively short life as compared to the rest of the alternator components. Worn brushes must be replaced, and such replacement can be time-consuming and expensive.

Further, the brushes used in brush-type alternators can produce sparks that may damage other nearby equipment, or may create electromagnetic interference problems. Brush-type alternators also tend to be noisy and are sensitive to dusty environments.

Brushless-type alternators overcome the brush related problems associated with brush-type alternators. However, compared to equivalent brush-type alternators, present brushless-type alternators are inefficient in terms of AC current output. They tend to be much larger in size and heavier than comparable output brush-type alternators. Brushless-type alternators are also more expensive than comparable output brush-type alternators.

SUMMARY OF THE INVENTION

Accordingly, a primary object of the present invention is to provide an improved alternator that overcomes the problems related to the brush-type alternators and disadvantages of the brush-type alternators while avoiding the weight, size, cost and electrical output disadvantages inherent in present brushless-type alternators.

Another object of the present invention is to provide an improved alternator in which the exciting current is supplied to the rotor assembly, as in a conventional brush-type alternator, but without employment the conventional brushes or other structure that results in relatively high friction, high wear due to mechanical contact between a rotating member and a relatively fixed member.

A further object of the present invention is to provide an improved alternator having a rotor assembly, which includes a rotatable shaft that rotates, as the rotor assembly rotates, about the shaft's longitudinal axis; a stator assembly that electromagnetically cooperates with the rotating rotor assembly so an AC current is generated upon the supply of an exciting current to the rotor assembly; and an improved contact assembly including: at least one, first, relatively fixed member that is disposed adjacent to the rotatable shaft and that is electrically conductive to the exciting current; at least one, second, moveable member that is mounted on the rotatable shaft adjacent to the first member, that rotates with the rotatable shaft, and that is electrically conductive to the exciting current and that defines, with the first member, an annular volume between the first and second members; and third, relatively moveable members that are electrically conductive to the exciting current, that are disposed between the first and second members in the annular volume, that have an electrically conductive grease which is packed in the annular volume and about the third members, and that permits the second member to rotate, relative to the first member, with relatively minimal friction between the first, second and third members.

These objects are met, in whole or in part, by an improved alternator of the present invention which may employ a rotor assembly, a stator assembly and a rotor shaft like those used in brush-type alternators but which does not utilize conventional brushes for supplying exciting current to the rotor assembly. More specifically, improved alternators of the present invention comprise a rotor assembly and a stator assembly, both of which assemblies may be of conventional design, and an improved contact assembly, which is used to supply exciting current to the rotor assembly instead of the conventional brush structures previously employed in brush-type alternators. In the preferred embodiments, the contact assembly includes two relatively low friction ball bearing assemblies that are electrically isolated from each other and that have components made of an electrically conductive materials. Each of the ball bearing assemblies has an outer race that is electrically connected to an inner race. This electrical connection between each bearing assembly's respective inner and outer races is provided by a plurality of bearing balls disposed between the inner and outer races, and additionally, by a highly electrically conductive grease that is packed about the balls and between the spaces around the balls so that the balls and grease substantially fill the annular volume defined between the inner and outer races. The inner races of the ball bearings are mounted on and rotate with the rotor assembly shaft. The ball bearings' outer races are held relatively stationary with respect to the inner races and are connected with field conductors, which, in turn, are connected with a source of DC exciting current such as, for example, a conventional storage battery.

The contact assembly of the present invention may also be enclosed in a cartridge housing that is made of an electrical insulative material and that maintains the outer races of the bearing assemblies axially aligned with and concentric about the longitudinal axis of the rotor shaft. The rotor shaft, adjacent to the contact assembly, includes stepped diameter portions that facilitate the assembly of the baring assemblies into and about the rotor shaft.

The improved alternator of the present invention affords commercially important advantages vis-a-vis conventional brush-type and brushless-type alternators. The improved alternator eliminates brushes, and their concomitant problems, and gives the long life characteristics of a brushless-type alternator. The improved alternator also provides the output characteristics of a brush-type alternator, which includes good output at low rpms as, for example, at 5000 rpms. The improved alternator also requires less space than conventional brushless-type alternators with the same output and is more economical and lighter in weight.

BRIEF DESCRIPTION OF THE SEVERAL VIEWS OF THE DRAWINGS

FIG. 4 is a schematic, partial vertical cross-sectional view of components of the contact assembly.

FIG. 5 is an exploded, isometric view of another embodiment of the improved alternator of the present invention.

FIG. 6 is an end elevational view of the housing of the improved alternator of FIG. 5, taken of the right end of the alternator as shown in FIG. 5.

DETAILED DESCRIPTION OF THE PREFERRED EMBODIMENTS OF THE INVENTION

As an overview, the improved contact assembly 12, hereinafter described, of the present invention is intended to be used with alternators which heretofore might have commonly been described a brush-type alternators. More particularly, the contact assembly 12 is intended to be employed in place of conventional alternator brush structure, that is, the structure used to supply DC exciting current to the rotor shaft of a rotor assembly of a brush-type alternator. For this reason, the conventional alternator structure, as illustrated in FIGS. 1 and 2 will be only generally described.

Figure 1:
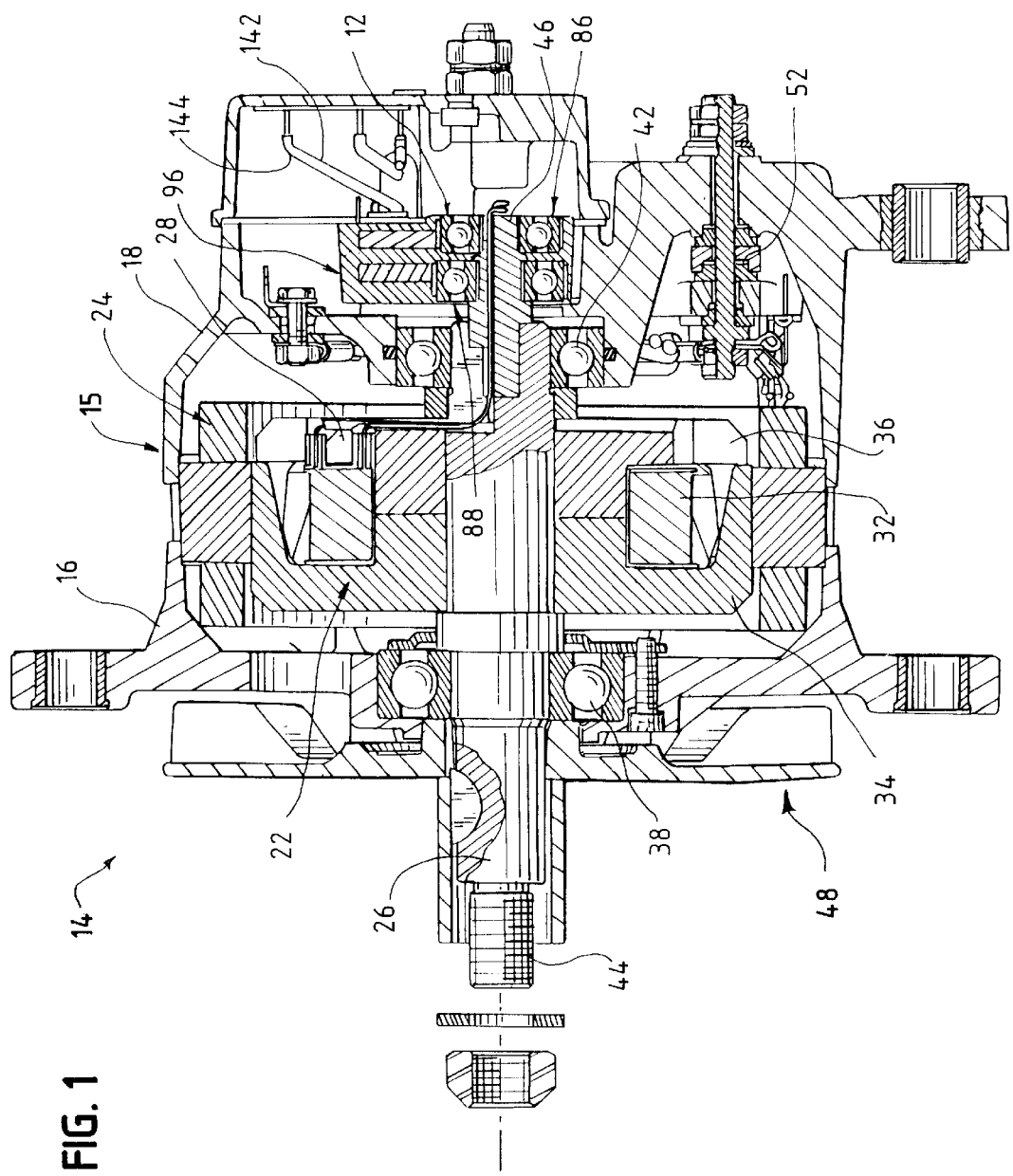
FIG. 1 is vertical cross-sectional view, taken along the longitudinal axis of the rotor assembly shaft, of the improved alternator of the present invention.
Figure 2:
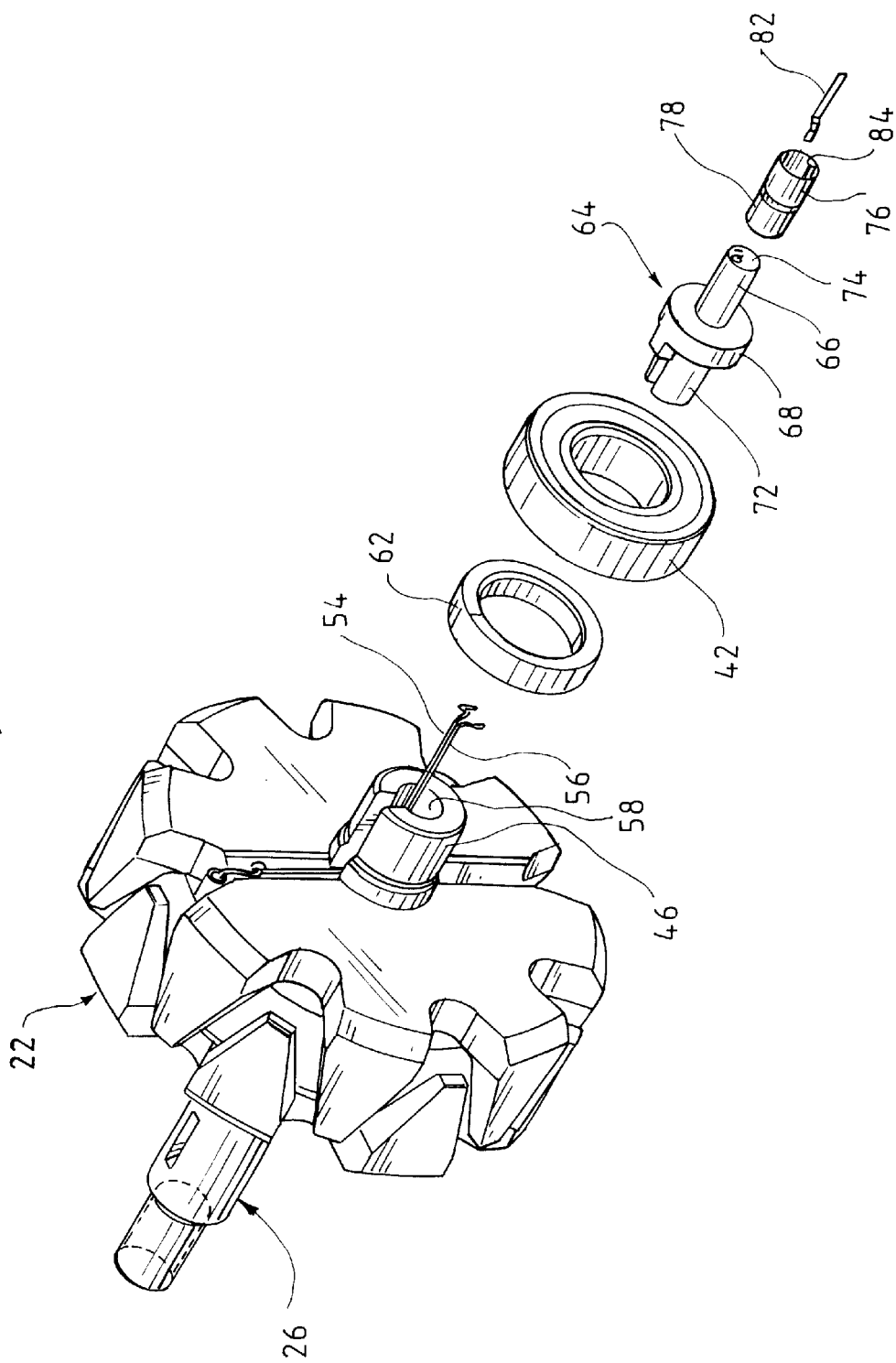
FIG. 2 is a partially exploded, perspective view of the rotor assembly and contact assembly of the alternator of the present invention.

In this regard the improved alternator 14, illustrated in FIG. 1, has a housing 15 that includes two die-cast aluminum parts (i.e., a front housing portion 16 and a rear housing portion 18). A rotor assembly 22 and stator assembly 24 are enclosed within the housing 14.

Referring now to the alternator embodiment of FIGS. 1–4, the rotor assembly 22 is of convention design and structure. The assembly 22 includes a centrally disposed rotor shaft 26, a field coil 28 disposed around an iron core 32, and two pole pieces 34, 36. The rotor assembly 22, including the shaft 26, rotates about the central longitudinal axis of the shaft 26. Conventional ball bearings 38 and 42 are mounted in the housing 14 and serve to support the shaft 26 and thus the entire rotor assembly 22, for rotation about the central longitudinal axis of the shaft 26. The one end 44 (the left end as shown in FIG. 1) of the shaft 26 may be connected with, for instances, a pulley, not shown, that may be driven by the engine of a motor vehicle, also not shown. The contact assembly 12 is disposed adjacent to the other end 46 (the right end as shown in FIG. 1) of the shaft 26 and will be more fully described hereinafter. A cooling fan blade 48 may also be mounted on the shaft 26, for rotation with the shaft, adjacent the bearing 38.

The stator assembly 24 is of conventional design and structure. The assembly 24 is disposed between the front and rear housing portions 16 and 18. The frame of the stator assembly is formed by a number of steel stampings riveted together. Around the stator frame, three windings are arranged in layers in three slots on the frame, and the ends of the windings are connected with a conventional rectifier 52.

As illustrated in FIGS. 1 and 2, a pair of conventional electrical leads 54 and 56 extend radially inwardly from the field core 28 to and into the shaft 26. The leads 54 and 56 then extend longitudinally, along a longitudinal internal passage 58 in the shaft, which passage 58 generally parallels the longitudinal shaft axis, toward and out of the other end 46 of the shaft 26. As noted, the end 46 is supported by the ball bearing 42, which is spaced from the rotor assembly 22 by a conventional spacer ring 62.

A stub shaft 64 is coupled to and from a part of the end 46 of the shaft 26. The end 46 and the stub shaft 64 may be coupled or inter-connected by a conventional shaft connection that will permit the stub shaft to rotate with the shaft 26.

The stub shaft 64 is preferably molded of nylon or any other suitable electrically non-conductive plastic material. It includes a distal end part 66, a larger diameter flange part 68, which abuts the distal end 74 of the shaft end 46, and a shaft coupling part 72. The leads 54, 56 extend longitudinally through the stub shaft 64 so that the distal ends of the leads may project out of and beyond the distal end 74 of the shaft 64.

The connector assembly 12 also includes a pair of rings 76, 78 that fit over and are mounted on, in a longitudinal spaced relationship, on the stub shaft part 66. The rings 76, 78 are preferable made of copper, are electrical conductive and maybe molded with the stub shaft 64. A pair of copper conductor poles 82, 84 are molded into the part 66. The inboard ends of the poles 82, 84 are electrically connected with the rings 76, 78 respectively. The other, outboard ends of the poles 82, 84 are connected, preferably by soldering, to the distal ends of the leads 54, 56, respectively.

Figure 3:
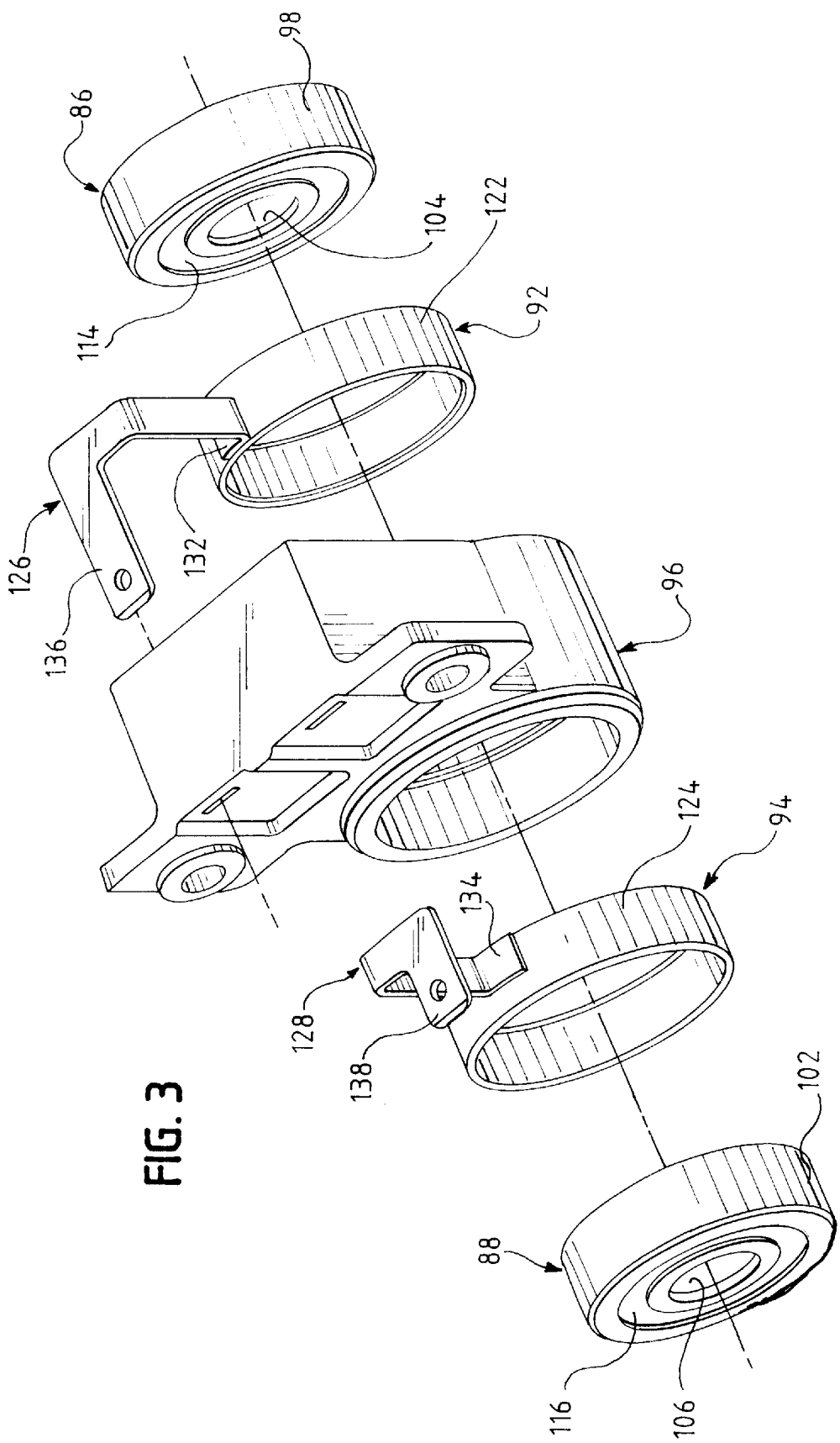
FIG. 3 is a partially exploded perspective view of components of the contact assembly of the alternator of the present invention.
Figure 7:
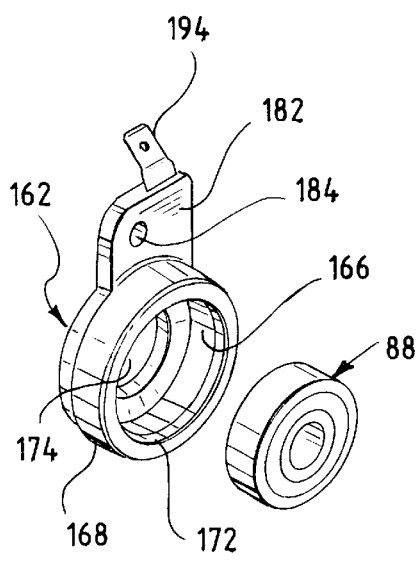
FIG. 7 is an exploded, isometric view of a portion of the cartridge housing assembly of the improved alternator of FIG. 5.
Figure 8:
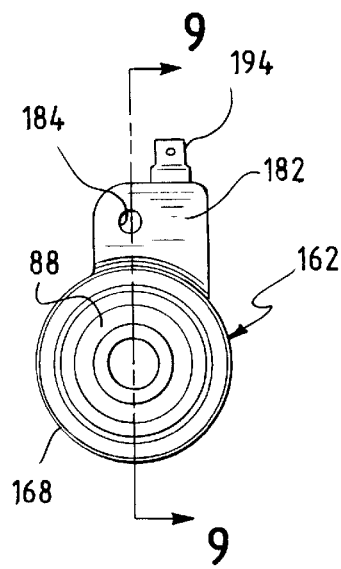
FIG. 8 is an end elevational view of the cartridge housing portion, as assembled, and as shown in FIG. 7.

As illustrated in FIGS. 1, 3 and 4, the contact assembly 12 further includes an outboard, relatively low-friction ball bearing or bearing assembly 86, an inboard, relatively low-friction ball bearing or bearing assembly 88, an outboard field conductor 92, an inboard field conductor 94 and a cartridge housing 96. A cartridge housing 96, which is preferably made of a molded, electrically non-conductive plastic or phenolic material, encloses and supports the ball bearings 86, 88 and the field conductors 92, 94.

Except as hereinafter noted, the ball bearings 86, 88 may be of a conventional design and construction. The ball bearings 86, 88 include outer races 98, 102, respectively, inner races, 104, 106, respectively, and a plurality of bearing balls 108, 112, respectively, which are disposed between, and in the annular volume defined between, the inner and outer races. The bearing balls 108, 112 may be maintained between their respective inner and outer races by conventional cages not shown in FIGS. 1–4. The ball bearings 86, 88 are made of a highly conductive material such as, for instance, high carbon chromium, low carbon steel, or a bronze/brass alloy. It is preferable that approximately one-third of the annular volume (which, as noted, is defined by and between the inner and outer race) is open, that is, not occupied by the balls. The bearings are packed in an electrically conductive grease that, with the balls and cage, completely fills the annular volume. A preferably useable grease is: Nyogel 753G, manufactured by NYE Lubricants Inc. of New Bedford, Mass. As shown best in FIG. 3, each of the annular volumes between the inner races 104,106 and the outer races 98,102, respectively, is closed by conventional lip seals 114,116 that close or seal both sides of the annular volumes (that is, the sides substantially perpendicular to the longitudinal axis of the rotor shaft 26) of each of the bearings 86,88. The lip seals 114,116 prevent the grease from escaping from about the balls 108,112 during rotation of the ball bearing 86,88 which normally will be in excess of 5000 rpms. The lip seals 114,116 may be made of a buna(nitride) material. The ball bearings 86,88 may be manufactured by NTN USA Corporation (NTN Bearing Corporation of America) of Mount Prospect, Ill.

The outer races 98, 102 each include a radially outwardly facing, annular copper layer. The inner races 104, 106 fit about, and are in surface-to-surface contact with the rings 76, 78, respectively. The fit, preferably press-fit, between the inner races 104, 106 and their respective rings 76,78 is such that no relative rotary movement occurs between them. Hence, both the inner races 104, 106 and the rings 76, 78 rotate with the stub shaft 64, and thus with the shaft 26.

The field connectors 92, 94 are made of copper and are cast or molded in the housing 96. The connectors 92, 94 include annular members 122, 124, respectively. The inner radial dimension of the annular members 122, 124 is such that the ball bearings 86, 88, and more particularly, their outer races 98, 102, tightly fit within the members 122, 124, respectively and so that there is surface-to-surface contact between the radical inner facing surfaces of the members 122, 124 and the radial outer facing surfaces of the outer races 98, 102. It is preferable that the longitudinal length or width (that is, the dimension in the longitudinal direction) of the members 122, 124 is approximately two-thirds of the longitudinal length of the outer races 98, 102.

The field connectors 92, 94 also includes a radially outwardly projecting, copper arms 126, 128, respectively. The radially inner ends 132, 134 of the arms 126, 128 respectively, are secured to the radially outwardly facing surface of the annular members 122, 124, respectively. The other, outer ends 136, 138 of the arms 126, 128, respectively, are disposed at an angle (90° as shown in FIG. 3) with the plane of the members 122, 124 and are adapted to be connected to the conventional electrical leads (shown at 142, 144 in FIG. 1) connected with a conventional storage battery, not shown, as a source of a DC current.

As noted, the outer races 98, 102 of the ball bearings 86, 88 are each electrically connected to the field conductors 92, 94, respectively. More specifically, the outer race 98 of the outboard bearing 86 is electrically connected with the outboard field conductor 92, and the outer race 102 of the inboard bearing 88 is electrically connected with the inboard field conductor 94. The field conductors 92, 94 are typically oppositely, electrically charged. For present, exemplary purposes, the outboard field conductor 92 is negatively charged, and the inboard field conductor 94 is positively charged. Thus, the outboard field conductor 92 is electrically connected to the negative terminal of the battery, and the inboard field conductor 92 is electrically connected to the positive terminal of the battery. However, this convention is not necessary, and the charges may be reversed.

As also noted, the inner races 104, 106 are electrically connected to the leads 54, 56, respectively, that extends from the field coil 28. Again and more specifically, inner race 104 of the outboard bearing 86 is electrically connected with the negative lead of the field coil, and the inner race 106 of the inboard bearing 88 is electrically connected with the positive lead of the field coil. As described before, the inner races 104, 106 of ball bearings 86, 88 are mechanically secured to and allowed to rotate with the stub shaft 64 while the outer races 98, 102 of the ball bearings 86, 88 remain relatively stationary and with the cartridge housing 96.

The DC exciting or field current from the positive terminal of the battery passes through the inboard field conductor 94 to the outer race 102 of the inboard ball bearing 88. From the outer race 102, the exciting current flows through the bearing 88 to the inner race 106. The current then flows from the inner race 106 to the ring 78, to the pole 82, to the positive lead 56 and ultimately to the field coil 28.

The exciting current flows through the field coil 28, thus creating a magnetic field needed to generate AC current by the electromagnetic cooperation between the rotating rotor assembly 22 and the stator assembly 24.

The exciting current then flows from the field coil 28, and through the negative lead 54, the pole 84, and the outboard ring 76 to the inner race 104 of the outboard ball bearing 86. The exciting current is then transmitted from the inner race 104, through the balls 108 and the surrounding grease, to the outer race 98 of the outboard bearing 86. The exciting current then flows from the outer race 98, to the outboard field conductor 92, to the lead 142 and ultimately to the battery through the battery's negative terminal.

While in the foregoing description of a preferred embodiment, two ball bearings 86,88 have been utilized to connect the exciting current from the battery to the electrical leads 54,56 it should be recognized that a single ball bearing assembly might be used to conduct this current. If such a single ball bearing were to be used in an alternator, it would include two sets of balls and its outer and inner races would have to be divided into two, longitudinal, electrically insulated portions, so that the single bearing would function as the two bearings 86,88 as described above.

It has been found that enhanced performance and longer bearing life will be achieved when the longitudinal axes of the rotor shaft, the stub shaft, the inner and outer races of the ball bearings are maintained axially aligned and concentric. Also manufacturing efficiencies can be achieved by making the sub shaft and ball bearings such that the inner diametric dimensions of the inner races of the two ball bearings are different, that is, where the ID of the inboard ball bearing is slightly larger than the ID of the outboard ball bearing. Also the manufacture and assembly of the alternator is improved when the cartridge housing is made in two, substantially mirror image parts or pieces.

Referring now to the alternator embodiment shown in FIGS. 5–11, an improved alternator 150 of the present invention, as shown in FIG. 5, is structurally and functionally identical to the alternator 14 except as noted below. More specifically, the alternator 150 includes a rear housing 152, a stub shaft 154, and a cartridge housing assembly 156 that are structurally and functionally identical to the housing 18, stub shaft 64 and housing 96, respectively, except as noted below. Otherwise (and except as noted) the alternators 14 and 150, and their other components are substantially identical in structure and function.

As best illustrated in FIGS. 5–6, the right facing end (with reference to FIG. 5) of the housing 152 includes a centrally disposed, generally key-hole shaped recess 158. This recess 158 is designed to closely receive the housing assembly 156 when the ball bearings 86,88 are assembled in the alternator 150. The shape and outer dimensions of the recess 158 are selected with respect to the shape and dimensions of the housing assembly 156 so that when the housing assembly 156 (with its component parts) is fit (preferably press-fit) within the recess 158, the fit maintains the ball bearings 86,88 and more particularly, the outer races 98,102, in axial alignment with and concentric about the longitudinal central axis of the shaft 26.

The cartridge housing assembly 156 includes two parts 162,164. The parts, 162,164 are generally structurally and functionally identical to each other except for the size of their recesses 166 as described below. Like the housing 96, the parts 162,164 are preferably made of molded, electronically non-conductive plastics or phenolic material.

When assembled, the parts 162,164 are arranged as mirror images of each other as illustrated in FIG. 5. Because of this, only the inboard part 162 will be described in detail. In this regard and with reference to FIG. 5 and particularly to FIGS. 7–9, the part 162 includes a head portion 168 whose outer peripheral shape and size is substantially identical to the correspondingly curved portion of the key hole recess 158. Hence when the parts 162,164 are fit (preferably press-fit) within the recess 158, they do not move with respect to the housing 152. The head portion 168 of the part 162 includes a central recess 166. Access to the recess 166 is through two openings 172,174 that are formed in axial facing sides of the head portion. The opening 172,174 have different diameters. The larger opening 172 is dimensioned and shaped so that the ball bearing 88 may be received within the recess 166. Specifically, the inner diametric dimension of the opening 172 and recess 166 are selected so that the outer diametric dimension of the bearing 88 will fit tightly (preferably press-fit) within the recess 166 through the opening 172. The smaller openings 174 is in the opposite side of the head portion 168 and is dimensioned so as to permit the stub shaft 154 to extend into and through that opening.

The part 162 (and also the part 164) includes integral leg portion 182 that depends or extends from adjacent to the side of the head portion that includes the smaller opening 174. The portion 182 includes a hole 184 that receives a bolt 186 that is used to secure the parts 162,164 together and to the housing 152. An annual spacer 188 also receives the bolt 186 and extends between the leg portions 182 of the parts 162,164. The spacer 188 is longitudinally dimensioned so that when assembled, the head portions 168 of the parts 162,164 abut face-to-face and with the openings 172 facing each other and so that the longitudinal axis of the recesses 166 are aligned and coaxial. As shown in FIG. 5, a viton "O" ring 190 is disposed and clamped between the abutting head portions 168 and surrounds the openings 172. The "O" ring 172 is made of a flor elastomer, provides heat insulation and prevents electrical shorting between the abutting adjacent head portions 168 of the parts 162,164.

An annular, copper field conductor ring 192, like the members 122,124 of the conductors 92,94, surround and define each of the recesses 166, and electrically cooperate with of the outer races 98,102. An electrical lead, not shown, is molded in each of the parts 162,164 and extends between the annular conductor 192 and connectors 194 which project from the distal ends of the portions 182 of each part 162,164. The connector 194, like the arms 126,128, are adapted to be connected with a conventional storage battery via a conventional voltage regulator.

As discussed below, the outer diametric dimensions of the outer races 98,102 have slightly different diameters. For this reason, the inner diametric dimensions of the recesses 166 in the parts 162,164 similarly have different diameters. Specifically, the recess 166 of the part 162 is dimensioned so that the outer race 102 of the bearing 88 can be press-fit within the recess. Similarly, the recess 166 of the part 164 is dimensioned so that the outer race 98 of the bearing 86 can be press-fit within the recess.

Figure 9:
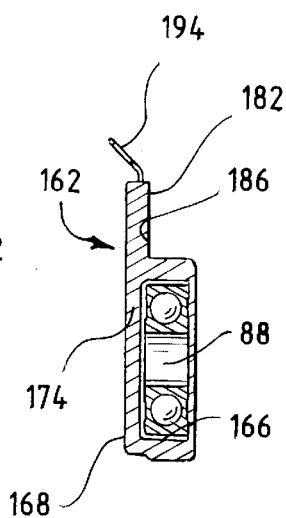
FIG. 9 is a cross-sectional view taken along the line 9—9 of FIG. 8.

As best illustrated in FIG. 9, a conventional cage 202 maintains the balls 112 separate and circumferentially evenly spaced from each other. The cage 202 is metal and hence does electrically interconnect the balls. In each of the bearings 86,88, the electronically conductive grease, which is packed about the balls 112 (and about the cage 202) is maintained within the annular volume (defined between the inner and outer races 102,106) by the two lip seals 204,206. In other words, the lip seals 204,206 prevent the grease from escaping from the annular volume, since were any grease to escape, the grease might cause an electrical short between the adjacent ball bearing.

Figure 11:
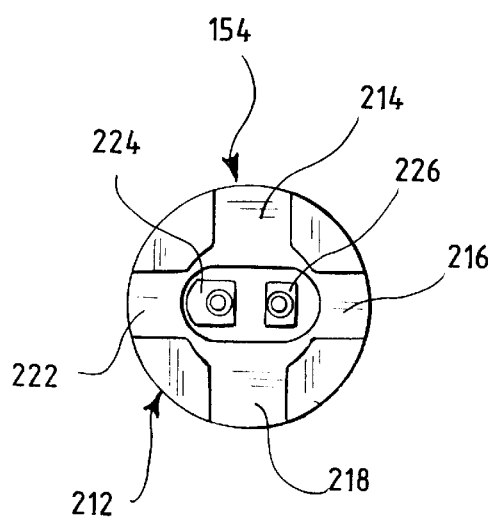
FIG. 11 is an end elevational view of the stub shaft of FIG. 10, taken of the left end of the shaft as shown in FIG. 10.
Figure 10:
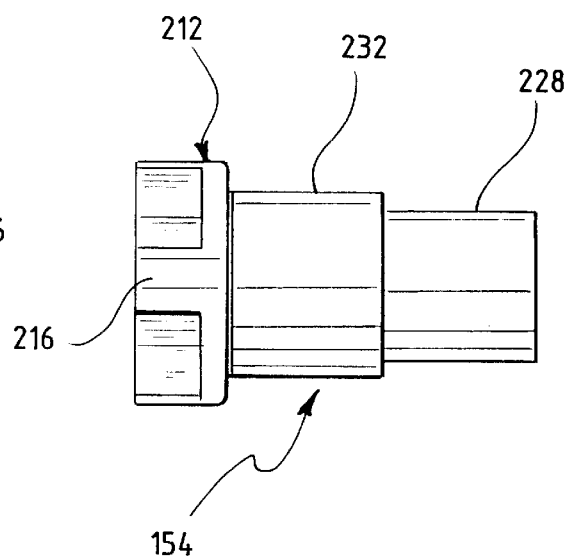
FIG. 10 is a side elevational view of the rotary stub shaft of the improved alternator of FIG. 5.

Referring now to FIGS. 5 and 10–11, the stub shaft 154 has an inboard end 212 that is configured and adapted to mechanically interconnect with the distal end (or right end as in FIG. 5) of the shaft 26. When thus interconnected, the shafts 26 and 154 are co-axially aligned and rotate together. Specifically, the end 212 includes four, evenly spaced, radially disposed shoulder portions 214, 216, 218 and 222 that interfit with corresponding, but annularly spaced shoulder portions (not shown) on the distal end of the shaft 26.

The inboard ends of the leads 54,56 in the shaft 154 terminate in axially recessed, electrical fittings 224,226. As shown in FIG. 11, these fittings 224,226 can be snap connected with corresponding fittings on the distal portions of the leads 55,56 in the shaft 26.

The distal end portion 228 of the shaft 154 has a preselected outer diametric dimension that is slightly smaller than the outer diametric dimension of the mid-portion 232 of the shaft 154. As with the shaft 64, the end portion 228 and mid-portion 232 include electrically conductive rings 76 and 78, respectively mounted (or preferably molded) about them. These rings are electrically connected with the leads 54,56, respectively.

The inner diametric dimensions of the inner races 104,106 of the ball bearings 86,88 are selected so that the inner races may be press-fit about the end, portions 228,232 (with rings), respectively. Differentiating (that is, stepping) the outer diametric dimensions of the portions 228,232 and the inner diametric dimension of the inner races 104,106 facilitates assembly of the bearings 86,88 onto the shaft 154. Hence the assembly of the entire contact assembly 156 onto the alternator 150

While the preferred embodiment of the present invention has been described, it will be understood that this description has been made by way of example and that it should be recognized that modifications and changes may be made by those in this art without departing from the spirit and scope of the invention.

What is claimed:

1. An improved alternator for use with motor vehicles and for supplying AC current for the operation of the motor vehicle in response to a DC exciting current being supplied to the alternator from a source of exciting current, the improved alternator comprising:

a rotor assembly;

a rotor shaft that has a longitudinal axis that has a first end and a second end, with the first end having a distal end portion, that is rotatable about the longitudinal axis, that is connected with the rotor assembly so that the rotor assembly is disposed radially outwardly from the longitudinal axis of the rotor shaft and so that the rotor assembly and the rotor shaft rotate together about the longitudinal axis and that includes electric leads which are electrically conductive to the exciting current which are connected with the rotor assembly and which extend toward the distal end portion of the first end of the rotor shaft, with the first end of the rotor shaft being made of a non-electrically conductive material;

a stator assembly disposed in relationship to the rotor assembly so that upon the supply of exciting current to the rotor assembly and the rotation of the rotor assembly relative to the stator assembly, AC current is generated by electromagnetic cooperation between the rotor assembly and the stator assembly; and a contact assembly including: first and second bearing assemblies that are disposed adjacent to the first end of the shaft, that are spaced longitudinally, along the longitudinal axis, from each other and that are electrically isolated from each other; each of the bearing assemblies having: an outer race member that is relatively fixed with respect to the rotor shaft, that is disposed radially adjacent to and radially outwardly from the first end of the rotor shaft, and that is electrically conductive to the exciting current; an inner race member that is mounted on and rotatable with the first end of the rotor shaft, that is disposed adjacent to and radially inwardly from the outer race member, and that is electrically conductive to the exciting current, with the inner and outer race members defining, radially therebetween, an annular volume; the contact assembly further including first and second electrically conductive members that are mounted on a first portion and a second portion, respectively, of the first end of the rotor shaft so that the first and second conductive members rotate with the rotor shaft and so that the first conductive member and the second conductive member are in electrical contact with the inner race member of the first bearing assembly and the inner race member of the second bearing assembly, respectively, with the first and second conductive members being connected with the electrical leads which are connected with the rotor assembly; and each of the bearing assemblies further including a plurality of rolling, relatively moveable members that are electrically conductive to the exciting current, that are radially disposed in the annular volume and that permit the inner race member, with the rotor shaft, to rotate relative to the outer race member with relatively minimal friction therebetween, with the inner and outer race members and the rolling members being radially aligned, with respect to the longitudinal axis, with the rolling members occupying a portion of the annular volume between the inner and outer race members, and with an electrically conductive grease being packed in the annular volume and about the rolling members so as to substantially fill portions of the annular volume not occupied by the rolling members and so that the rolling members and the grease provide the electrical connection for the exciting current between the inner and outer race members.

2. The improved alternator of claim 1 wherein an alternator housing encloses the rotor assembly; wherein the outer race members are mounted in and supported by a cartridge housing; and wherein the cartridge housing is mounted in the alternator housing so that the outer race members of the bearing assemblies are maintained in a coaxial and concentric relationship with respect to the longitudinal axis of the rotor shaft during operation of the alternator.

3. The improved alternator of claim 1 wherein the contact assembly still further includes a first annular field conductor that is electrically connected with the outer race member of the first bearing assembly, and a second annular field conductor that is electrically connected with the outer race member of the second bearing assembly; wherein the first and second field conductors are electrically connected with the source; wherein the first field conductor, in part, surrounds the outer race member of the first bearing assembly and the second field conductor, in part, surrounds the outer race member of the second bearing assembly; and wherein of the outer race members of the first and second bearings assemblies are in substantial surface-to-surface and electrical conductive contact with the first and second field conductors, respectively.

4. The improved alternator of claim 1 wherein the rolling members are a plurality of balls; wherein in each bearing assembly, the balls occupy approximately two-thirds of the annular volume between the inner and outer races; and wherein the electrically conductive grease is packed about the balls so that the annular volume is substantially filled by the balls and the conductive grease.

5. The improved alternator of claim 4 wherein each of the first and second bearing assemblies include side sealing members to seal the annular volume sides, which sides are substantially perpendicular to the longitudinal axis of the rotor shaft, so as to substantially prevent the escape of conductive grease from the annular volume during operation of the alternator.

6. The improved alternator of claim 5 wherein the alternator includes a cage assembly; and wherein the cage assembly maintains the balls circumferentially spaced apart from one another in the annular volume; and wherein in each of the first and second bearing assemblies, the conductive grease is packed about the balls and cage assembly and substantially fills the annular volume between the inner and outer race members and the side seal.

7. The improved alternator of claim 5 wherein an alternator housing encloses the rotor assembly; wherein the outer race members are mounted in and supported by a cartridge housing; wherein the cartridge housing is mounted in the alternator housing so that the outer race members of the bearing assemblies are maintained in a coaxial and concentric relationship with respect to the longitudinal axis of the rotor shaft during operation of the alternator; wherein the contact assembly further includes a first annular field conductor that is electrically connected with the outer race member of the first bearing assembly, and a second annular field conductor that is electrically connected with the outer race member of the second bearing assembly; wherein the first and second field conductors are electrically connected with the source; wherein the first field conductor, in part, surrounds the outer race member of the first bearing assembly and the second field conductor, in part, surrounds the outer race member of the second bearing assembly; and wherein the outer race members of the first and second bearings assemblies are in substantial surface-to-surface and electrical conductive contact with the first and second field conductors, respectively.

8. The improved alternator of claim 7 wherein the first and second conductive members are annular in shape; wherein the first conductive member is adjacent to the distal end portion of the first end of the rotor shaft; and wherein the second conductive member is adjacent to the first conductive member and is disposed longitudinally between the first conductive member and the second end of the rotor shaft.

9. The improved alternator of claim 5 wherein the first and second conductive members are annular in shape; wherein the first conductive member is adjacent to the distal end portion of the first end of the rotor shaft; and wherein the second conductive member is adjacent to the first conductive member and is disposed longitudinally between the first conductive member and the second end of the rotor shaft.

10. The improved alternator of claim 1 wherein the first and second conductive members are annular in shape; wherein the first conductive member is adjacent to the distal end portion of the first end of the rotor shaft; wherein the second conductive member is adjacent to the first conductive member and is disposed longitudinally between the first conductive member and the second end of the rotor shaft; and wherein the outer diametric dimension of the first conductive member is less than the outer diametric dimension of the second conductive member and the inner diametric dimension of the inner race member of the first bearing assembly is less than the inner diametric dimension of the inner race member of the second bearing assembly.

11. An improved alternator for use with motor vehicles and for supplying AC current for the operation of the motor vehicle in response to a DC exciting current being supplied to the alternator from a source of exciting current, the improved alternator comprising:

a rotor assembly;

an alternator housing enclosing the rotor assembly;

a rotor shaft that has a longitudinal axis that has a first end and a second end, with the first end having a distal end portion, that is rotatable about the longitudinal axis, that is connected with the rotor assembly so that the rotor assembly is disposed radially outwardly from the longitudinal axis of the rotor shaft adjacent the first end and so that the rotor assembly and the rotator shaft rotate together about the longitudinal axis and that includes electric leads which are electrically conductive to the exciting current which are connected with the rotor assembly and which extend toward the distal end portion of the first end of the rotor shaft;

a stator assembly disposed in relationship to the rotor assembly so that upon the supply of exciting current to the rotor assembly and the rotation of the rotor assembly relative to the stator assembly, AC current is generated by electromagnetic cooperation between the rotor assembly and the stator assembly;

a contact assembly including: first and second bearing assemblies that are disposed adjacent to the first end of the shaft, that are spaced longitudinally, along the longitudinal axis, from each other and that are electrically isolated from each other; each of the bearing assemblies having: an outer race member that is relatively fixed with respect to the rotor shaft, that is disposed radially adjacent to and radially outwardly from the first end of the rotor shaft, and that is electrically conductive to the exciting current; an inner race member that is mounted on and rotatable with the first end of the rotor shaft, that is disposed adjacent to and radially inwardly from the outer race member, and that is electrically conductive to the exciting current, with the inner and outer race members defining, radially therebetween, an annular volume;

the contact assembly further including a first annular field conductor that is electrically connected with the outer race member of the first bearing assembly, and that, in part, surrounds the outer race member of the first bearing assembly, and a second annular field conductor that is electrically connected with the outer race member of the second bearing assembly, and that, in part, surrounds the outer race member of the second bearing assembly; with the first and second field conductors being electrically connected with the source; with the outer race members of the first and second bearings assemblies being in substantial surface-to-surface and electrical conductive contact with the first and second field conductors, respectively; with the outer race members being mounted in and supported by a cartridge housing; and with the cartridge housing being mounted in the alternator housing so that the outer race members of the bearing assemblies are maintained in a coaxial and concentric relationship with respect to the longitudinal axis of the rotor shaft during operation of the alternator;

the contact assembly still further including a plurality of rolling, relatively moveable members that are electrically conductive to the exciting current, that are radially disposed in the annular volume and that permit the inner race member, with the rotor shaft, to rotate relative to the outer race member with relatively minimal friction therebetween; with the inner and outer race members and the rolling members being radially aligned, with respect to the longitudinal axis; with the rolling members occupying a portion of the annular volume between the inner and outer race members; and with an electrically conductive grease being packed in the annular volume and about the rolling members so as to substantially fill portions of the annular volume not occupied by the rolling members and so that the rolling members and the grease provide the electrical connection for the exciting current between the inner and outer race members.

12. The improved alternator of claim 11 wherein the first end of the rotor shaft is made of a non-electrically conductive material; wherein first and second electrically conductive members are mounted on first and second portions, respectively, of the first end of the rotor shaft so that the first and second conductive members rotate with the rotor shaft and so that the first and second conductive members are in electrical contact with the inner race members of the first and second bearing assemblies, respectively; wherein the first and second conductive members are connected with the electrical leads connected with the rotor assembly; wherein the first and second conductive members are annular in shape; wherein the first conductive member is adjacent to the distal end portion of the first end of the rotor shaft; and wherein the second conductive member is adjacent to the first conductive member and is disposed longitudinally between the first conductive member and the second end of the rotor shaft.

13. The improved alternator of claim 12 wherein the outer diametric dimension of the first conductive member is less than the outer diametric dimension of the second conductive member and the inner diametric dimension of the inner race member of the first bearing assembly is less than the inner diametric dimension of the inner race member of the second bearing assembly.

* * * * *